Jan. 1, 1952

L. W. REDDICK 2,580,956

SIGNAL DEVICE FOR FISHERMEN

Filed Nov. 28, 1947

Inventor
LEONARD W. REDDICK
By Frank J. Schraeder Jr.
Attorney

Patented Jan. 1, 1952

2,580,956

UNITED STATES PATENT OFFICE 2,580,956

SIGNAL DEVICE FOR FISHERMEN

Leonard W. Reddick, Spearville, Kans.

Application November 28, 1947, Serial No. 788,540

6 Claims. (Cl. 43—17)

My invention has particular reference to improved circuit-closing switches for signal devices for use by fishermen in day or night fishing with pole and line or with rod and reel and especially for night bobber fishing and has among its objects to provide a novel and comparatively simple switch for electric signal circuits such as the circuit in a tubular flashlight signal; the switch being adapted to be connected in the battery circuit of an electric lantern or electric light device as, for example, to the battery compartment cover of a well known type of cylindrical flashlight and the switch being operative by the fishline from open circuit position into closed circuit position to thereby energize a visual signal constituting the electric light bulb of the flashlight upon withdrawal of the line from the switch mechanism in response to a pull on the line exerted by a fish caught on that line.

Another object of my invention is found in the provision of electric light signal means operable by the fishline and constituting a portable support carrying a switch which is operable from open circuit position into closed circuit position by the pull exerted by a fish caught on that line; the portable switch-carrying support being adapted to be inserted into the ground and electrically connected with a flashlight disposed at a remote point from the portable support.

My improved switch is obviously operable for actuating an audible signal such as an electric bell connected within the circuit controlled by my improved switch.

The various features of novelty whereby my invention is characterized will hereinafter be pointed out with particularity in the claims; but, for a full understanding of the invention and its various objects and advantages, reference may be had to the following detailed description in connection with the accompanying drawing wherein:

In the drawing, like reference characters designate like or corresponding members or parts.

Figure 1:
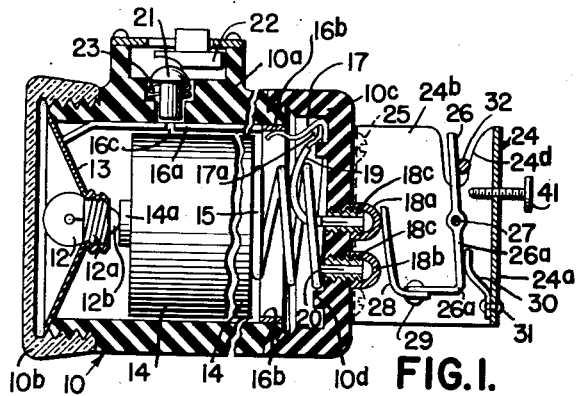
Figure 1 is a vertical section through my improved switch and through a typical cylindrical battery operated flashlight; the section being taken on line 1—1 of Figure 2 and the flashlight portion being broken to shorten the illustration thereof.
Figure 2:
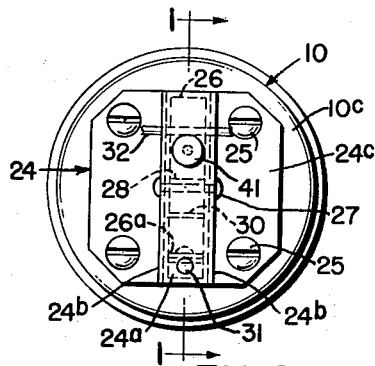
Figure 2 is a front elevation of the switch.
Figure 5:
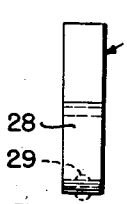
Figure 5 is a face view of the switch circuit-closing member.
Figure 4:
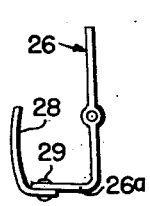
Figure 4 is a side elevation of the switch circuit-closing member.

As shown in the drawing, the flashlight is generally designated by number 10 and consists of an electrically non-conductive tubular casing 10ª, a glass combined closure and lens element 10ᵇ, and a cover 10ᶜ for the rear end of the casing; the element 10ᵇ and the cover 10ᶜ being screw threaded onto their respective ends of the casing 10ª.

Within the casing 10ª is an electric light bulb 12 which is screw-mounted within the center of the reflector 13.

The electric light bulb 12 is electrically connected with a contact 14ª of one or more dry batteries 14.

An electrically-conductive coil spring 15 mounted between the end of a battery 14 and the inner face of the electrically non-conductive cover 10ᶜ retains the batteries in contact with one another and with the contact 14ª of the foremost battery in contact with the central contact of the electric light bulb 12; the larger rear end of the spring 15 being centered within the molded circular rib 10ᵇ of the cover 10ᶜ.

Within the casing, extending longitudinally of and against the inner face thereof, is a conductor strip 16ª the rear end of which is connected to or made integral with the circular contact ring 16ᵇ.

The forwardly disposed portion of the conductor strip 16ª is split to form a gap, as at 16ᶜ, and the forward end is arranged to contact with the reflector 13.

Within the cover 10ᶜ is a resilient contact arm 17 which is screw-connected at one end to the inside face of the cover 10ᶜ, as by screw 17ª, and its free end is in sliding contact with the contact ring 16ᵇ when the cover 10ᶜ is screwed onto the casing 10ª.

The circuit for energizing the electric light bulb signal 12 is arranged to be controlled through a pair of contacts 18ª and 18ᵇ each of which consists of an electrically conductive exteriorly threaded tubular sleeve 18ᶜ having threaded connection in the cover 10ᶜ and projecting outwardly beyond the outer face of the cover to receive thereon the interiorly threaded electrically conductive contact cap 18ᵃ or 18ᵇ.

The caps 18ᵃ and 18ᵇ constitute vertically aligned contacts for the signal operating circuit; the sleeve 18ᶜ of the upper contact 18ᵃ receives therein one conductive end of an insulated conductor 19 the opposite end of which is electrically connected with the secured end of the resilient contact arm 17 by means of the screw 17ᵃ and the sleeve 18ᶜ of the lower contact 18ᵇ receives therein one end of a short conductor 20 the opposite end of which is soldered or otherwise securely connected to the electrically conductive spring 15.

Figure 6:
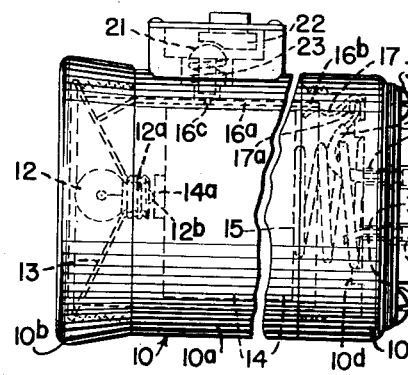
Figure 6 is a side elevation of my improved signal connected by a remote control extension cord shown connected by a plug with a receptacle therefor carried on the flashlight cover.

In order to prevent waste of current when the flashlight is not in use, a safety switch may be provided as shown in Figures 1 and 6 and which switch consists of a headed pin 21 adapted to close the circuit through the gap 16ᶜ of the strip 16ᵃ when the slidably mounted operating cam 22 is moved into closed circuit position to depress the pin 21 against the pressure of the coil spring 23.

When the flashlight device is in use as a fisherman's electric light signal, the switch pin 21 is placed into closed circuit position by the cam 22 and under such condition one side of the circuit extends from the outer side of the threaded sleeve base 12ᵃ of the bulb 12, through the reflector 13, through the conductor strip 16ᵃ, through the contact ring 16ᵇ, and through the contact arm 17 and condctor 19 to the contact 18ᵃ.

The other side of the circuit extends from the bulb center contact 12ᵇ through the contact 14ᵃ and batteries 14, through the coil spring 15 and through the conductor 20 and sleeve 18ᶜ to the lower contact 18ᵇ. Thus the electric light signal circuit may be closed and opened through the spaced vertically aligned contacts 18ᵃ and 18ᵇ by my improved switch.

My improved switch, as preferably shown in the accompanying drawing in preferred illustrative embodiments, includes a housing, generally designated by numeral 24, comprising a unitary metal stamping consisting of a front wall 24ᵃ extending between spaced parallel sides 24ᵇ disposed angularly to and formed integrally with the front wall 24ᵃ.

To provide means for securely mounting the housing 24 onto the outer face of the cover 10ᶜ, as by screws 25, the sides 24ᵇ are formed with integral relatively oppositely disposed flanges 24ᶜ.

Mounted within the housing 24, between the sides 24ᵇ, is a switch which is adapted to close the circuit between the contacts 18ᵃ and 18ᵇ and which switch, as preferably shown in the drawing, comprises a circuit closing and opening arm 26, preferably of electrically non-conductive material, which is pivotally supported intermediate its ends on a pivot pin 27 carried on the housing sides 24ᵇ.

The lower portion 26ᵃ of the switch arm 26 is preferably bent angularly and carries a preferably resilient electrically conductive circuit-closing contact blade 28 secured to the arm portion 26ᵃ, as by the rivet 29.

The switch arm 26 is normally urged into circuit closing position wherein the resilient contact blade 28 is flexed to contact with both of the contacts 18ᵃ and 18ᵇ to thereby close the circuit between the contacts 18ᵃ and 18ᵇ. Any suitable resilient means may be provided to normally urge the switch arm 26 into circuit closing position such as, for example, a coil spring (not shown) which may be interposed below the pivot pin 27 between the arm 26 and the inner face of the housing front wall 24ᵃ, however, I have preferred to show such means in the form of a leaf spring 30 having its lower end secured to the housing front wall 24ᵃ as by the rivet 31.

As shown in Figure 1, the upper portions of the side walls 24ᵇ are provided with horizontally aligned V-shaped recesses 24ᵈ. The upper portion of the switch arm 26 is movable between relatively angularly disposed planes coinciding with the transversely aligned pairs of side edges of the recesses 24ᵈ.

My invention is particularly adapted for bobber fishing where the fisherman is not desirous of holding the fishline or a pole supporting the fishline.

My signal device comprising the flashlight and my improved switch can readily be utilized for operation with a pole or otherwise suspended fishline.

My improved electric light signal may readily be placed into operation by simply closing the circuit to the light bulb 12 through the switch pin 21 and then inserting an intermediate portion of the fishline 32 across and in the V-shaped recesses 24ᵈ and between the upper end of the outer face of the switch arm 26 and the outer pair of laterally aligned corresponding edges of the recesses 24ᵈ as clearly shown in Figure 1.

Any convenient intermediate portion of the fishline may be inserted into and across the pair of aligned recesses 24ᵈ as, for example, any intermediate portion between the inner end of the fishline and outer portion from which the fishhook or hooks are suspended. Such intermediate portion of the fishline may be that portion between the portion wound upon a reel and the portion suspended from the end of a pole or rod.

With the fishing pole suitably supported in an inclined or lateral position, the flashlight signal may be laid upon the ground or other support upon which the fishing pole is supported. When a fish is caught upon the line or forcibly grabs a baited hook, the fishline 32 will be very quickly snapped out of the position shown in Figure 1, whereupon the leaf spring 30 will forcibly swing the switch arm 26 about the pivot pin 27 causing its lower portion to swing toward the left, as viewed in Figure 1, thereby flexing the circuit-closing blade 28 to close the circuit between the contacts 18ᵃ and 18ᵇ to energize the electric light signal 12.

The remotely controlled signal illustrated in Figure 6 is readily adapted for operating an electric signal placed remotely from where the fishing pole is located as, for example, in a fisherman's tent and consists of the flashlight signal device 10 but with the cover 10ᶜ modified as with tubular conductors 33 to receive therein the ends of the conductors 19 and 20.

The tubular conductors 33 extended beyond the outer face of the cover 10ᶜ into tubular conductors 34 which are embedded within the electrically non-conductive receptacle 35 which is securely mounted on the outer face of the cover 10ᶜ as by screws 36.

The extension cord 37 is provided at one end with a plug 38 having pin type conductors 39 which engage within the tubular conductors 34 of the receptacle 35. The opposite ends of the two-wire cord 37 are connected within the exteriorly threaded conductor sleeves 39' the inner ends of which extend through the wall of the casing 40 to receive thereon the cap-like contacts 18ª and 18ᵇ.

The casing 40 is provided with the same circuit-closing switch mechanism as that hereinabove described and illustrated in Figures 1 to 5 inclusive, the pair of opposite side walls 40ª being provided with V-shaped recesses 24ᵈ as above described.

To facilitate the support of the switch-carrying casing 40 at a convenient place close to the fishing pole, the casing 40 may be provided with a pointed prong 40ᵇ which is readily insertable into the ground.

The operation of the switch within the casing 40 being like that above described for the electric signal shown in Figures 1 to 5 inclusive.

To prevent waste of battery current when the signal device is not in use in the event the circuit should for any unforeseen or inadvertent cause be closed through the circuit-closing pin 21, I provide a safety screw 41 which may readily be screwed inwardly into engagement with the switch operating arm 26 to retain the arm 26 in open circuit position in lieu of the fishing line 32.

Figures 3, 8:
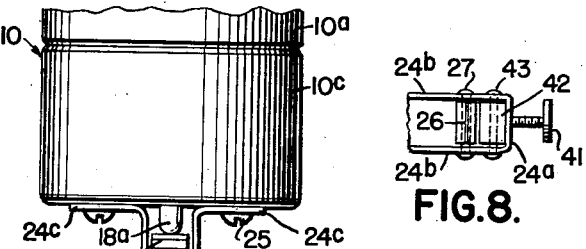
Figure 3 is a plan view of the switch and the rear end portion of the flashlight.
Figure 8 is a fragmentary top view taken on line 8—8 of Figure 7.
Figure 7:
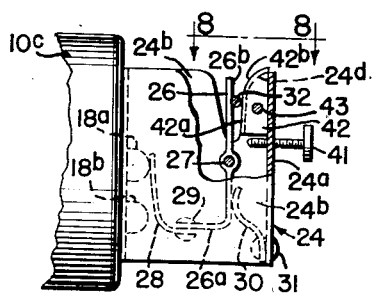
Figure 7 is a side elevation of a modified switch housing with a portion of the side wall shown broken away to show the added contact block.

In the modified switch housing shown in Figures 7 and 8, I interpose a contact block 42 between the inner faces of the housing sides 24ᵇ and adjacent the inner face of the front wall 24ª.

The contact block 42 is secured to the housing by means of a rivet 43 and is provided with a contact face having a substantially vertically disposed lower face portion 42ª which is continuous with the upper arcuate face portion 42ᵇ and this composite contact face preferably extends slightly inwardly beyond the edges 24ᵈ of the recesses in the side walls 24ᵇ so as to provide a smooth-faced bearing surface for the fishline 32 when it is inserted between the contact block 42 and the switch arm 26 in operative position.

To facilitate the insertion of the fishline 32 into operative position within the housing recesses, the upper portion of the switch arm 26 may be beveled slightly, as at 26ᵇ, to cooperate with the arcuate face portion 42ᵇ of the block 42.

I claim:

1. A switch for a fisherman's signal device operable by a fishing line and comprising a casing including a circuit containing a battery and an electrically operable signal, said switch being adapted to close said circuit to energize said signal and comprising a housing secured to said casing and including a pair of contacts in said circuit disposed within said housing, a movable arm carried on said housing, and a spring urging said arm into position to close said circuit through said contacts, said arm being restrained in open circuit position by the fishing line having a portion thereof interposed between said arm and said housing while under pressure of said spring and, upon disengagement of said fishing line from contact with said arm in response to a pull on said line by a fish, said arm being movable by said spring into position to close said circuit through said contacts to thereby energize said signal.

2. A switch for a fisherman's signal device operable by a fishing line and comprising a flashlight casing provided with a circuit containing a battery, an electric light signal at one end of the casing, a pair of contacts, and a removable cover at the other end of the casing, said contacts being disposed on the outer face of said cover; said switch being adapted to close the circuit through said contacts and comprising a housing mounted on the outer face of said cover over said contacts, a switch arm pivotally mounted within said housing, and a spring supported within said housing urging said arm into position to close said circuit through said contacts, said arm being yieldingly retained in open circuit position by the fishing line having a portion thereof interposed between said arm and a portion of said housing while said arm is under pressure exerted by said spring and, upon disengagement from contact with said arm in response to a pull on said line by a fish, said arm being movable by said spring into position to close said circuit through said contacts to thereby energize said electric light signal.

3. A switch for a fisherman's signal device as set forth in claim 2 wherein said housing comprises a unitary structure of U-shaped cross-section having opposed side wall portions between which said contacts are positioned, said side wall portions having integral oppositely disposed flange portions connected to the outer face of said cover.

4. A switch for a fisherman's signal device as set forth in claim 3 wherein the upper portions of said opposed side wall portions are provided with V-shaped recesses transversely aligned within the plane of movement of said switch arm and into which said recesses the fishing line may be inserted to be yieldingly frictionally retained between said arm and a pair of transversely aligned edges of said recesses.

5. A switch for a fisherman's signal device as set forth in claim 1 wherein said housing is provided with a pair of V-shaped recesses transversely aligned within the plane of movement of a portion of said arm and into which said recesses the fishing line may be inserted to be yieldingly frictionally retained between said arm and a pair of transversely aligned edges of said recesses.

6. A switch for a fisherman's signal device operable by a fishing line and comprising a casing including a circuit containing a battery, an electric signal, and a pair of contacts, said switch being adapted to close said circuit through said contacts and comprising a housing of U-shaped cross-section having opposed side walls between which said contacts are positioned and flanges on said side walls for securing the housing to said casing including transversely aligned V-shaped recesses in the upper ends of said opposed side walls, a contact block secured within said housing between said side walls having a contact face the lower portion of which is disposed in a vertical plane and the upper portion of which is arcuate, said contact block being mounted adjacent said V-shaped recesses with said contact face disposed inwardly slightly beyond a pair of corresponding transversely aligned edges of said V-shaped recesses, a switch arm pivotally mounted between said housing side walls inwardly of said contact block, a spring carried on said housing between said side walls urging said arm into position to close said circuit through said contacts, said arm being restrained in open circuit position by the fishing line having a portion thereof interposed between said arm and said vertical portion of said contact face of said contact block while said arm is under pressure by said spring and, upon the disengagement of the fishing line from its position between said arm and said contact block, in response to a pull on the fishing line by a fish, said arm then being movable by said spring into position to close said circuit through said contacts to thereby energize said signal.

LEONARD W. REDDICK.

REFERENCES CITED

The following references are of record in the file of this patent:

UNITED STATES PATENTS

| Number | Name | Date |
|---|---|---|
| 522,352 | Poppowitsch | July 3, 1894 |
| 1,309,365 | Monighan | July 8, 1919 |
| 1,737,921 | Derr | Dec. 3, 1929 |
| 2,145,929 | Herman | Feb. 7, 1939 |
| 2,196,784 | Simmons | Apr. 19, 1940 |
| 2,349,077 | Comparelli | May 16, 1944 |
| 2,354,279 | Ross | July 25, 1944 |
| 2,409,988 | Schwebs | Oct. 22, 1946 |